US008492680B2

United States Patent
Ohashi et al.

(10) Patent No.: US 8,492,680 B2
(45) Date of Patent: Jul. 23, 2013

(54) HEATING DEVICE FOR SEAT

(75) Inventors: Tadahiko Ohashi, Hamamatsu (JP); Yasuhiro Ohashi, Hamamatsu (JP)

(73) Assignee: Kurabe Industrial Co., Ltd., Hamamatsu-shi, Shizuoka-ken (JP)

( * ) Notice: Subject to any disclaimer, the term of this patent is extended or adjusted under 35 U.S.C. 154(b) by 1140 days.

(21) Appl. No.: 11/990,201

(22) PCT Filed: Aug. 10, 2006

(86) PCT No.: PCT/JP2006/315872
§ 371 (c)(1),
(2), (4) Date: Feb. 8, 2008

(87) PCT Pub. No.: WO2007/018271
PCT Pub. Date: Feb. 15, 2007

(65) Prior Publication Data
US 2009/0095725 A1 Apr. 16, 2009

(30) Foreign Application Priority Data
Aug. 11, 2005 (JP) .................................. 2005-233820

(51) Int. Cl.
*B60L 1/02* (2006.01)
(52) U.S. Cl.
USPC ....... 219/202; 219/217; 219/494; 297/180.12
(58) Field of Classification Search
USPC ................. 219/202, 203, 204, 205, 206, 217, 219/494, 497, 481, 483, 505, 506; 297/180.12
See application file for complete search history.

(56) References Cited

U.S. PATENT DOCUMENTS
4,813,738 A * 3/1989 Ito ............................. 297/180.12
(Continued)

FOREIGN PATENT DOCUMENTS
JP      59-21739      2/1984
JP      59-50362      4/1984
(Continued)

OTHER PUBLICATIONS
Machine translation of JP 2000-342382.*

*Primary Examiner* — Henry Yuen
*Assistant Examiner* — John Wasaff
(74) *Attorney, Agent, or Firm* — Yokoi & Co., U.S.A., Inc.; Toshiyuki Yokoi

(57) ABSTRACT

A heating device for a seat exhibiting excellent durability, reliability, safety and enhanced workability in fixing work to a seat while reducing the cost and weight and ensuring comfortable feeling at seating without causing a strange feeling. The heating device for a seat comprises a heating matter (4) including a base substance (2) and a heating wire (3) arranged on the base substance, a temperature detection element (5) for detecting temperature of the heating matter, and a temperature control circuit (1) for controlling temperature of the heating matter based on the output from the temperature detection element, characterized in that the temperature detection element and the temperature control circuit are arranged at predetermined positions on the base substance. The temperature control circuit is insulation-covered together with a part of lead wires connected to the temperature control circuit.

17 Claims, 5 Drawing Sheets

U.S. PATENT DOCUMENTS

| | | | |
|---|---|---|---|
| 4,865,379 A * | 9/1989 | Aoki et al. | 297/180.12 |
| 5,002,335 A * | 3/1991 | Bengtsson | 297/180.12 |
| 5,075,537 A * | 12/1991 | Lorenzen et al. | 219/497 |
| 5,176,424 A * | 1/1993 | Tobita et al. | 297/284.1 |
| 6,073,998 A * | 6/2000 | Siarkowski et al. | 297/180.12 |
| 6,189,487 B1 * | 2/2001 | Owen et al. | 119/28.5 |
| 6,252,208 B1 * | 6/2001 | Topp | 219/497 |
| 6,541,737 B1 * | 4/2003 | Eksin et al. | 219/217 |
| 7,134,715 B1 | 11/2006 | Fristedt et al. | |
| 2006/0151477 A1 * | 7/2006 | Sundal et al. | 219/549 |

FOREIGN PATENT DOCUMENTS

| | | |
|---|---|---|
| JP | 8-203706 | 8/1996 |
| JP | 2000-342382 | 12/2000 |
| JP | 2001-356042 | 12/2001 |
| JP | 2001-524705 | 12/2001 |
| JP | 2004-504082 | 2/2004 |
| JP | 2004-217796 | 8/2004 |
| JP | 2004-272755 | 9/2004 |

* cited by examiner

HEATING DEVICE FOR SEAT

TECHNICAL FIELD

The present invention relates to a heating device for seat such as automobile seat heater, which is mounted on a vehicle seat and heats the seat. In particular, the present invention relates to a heating device for seat exhibiting excellent durability, reliability, safety and enhanced workability in fixing work to a seat while reducing the cost and weight and ensuring comfortable feeling at seating without causing a strange feeling.

BACKGROUND ART

As a typical and ordinary example of conventional heating device for seat, there has been provided a heating device, in which a heating matter comprising a heating wire (code-like heater) is controlled by thermostat to maintain a predetermined temperature. However, this type of temperature control by thermostat determines the temperature of heating matter according to the activating temperature of thermostat, and if a user wishes to set the temperature of seat heating device so that comfortable seating feeling may be obtained, a plurality of thermostats respectively having different activating temperatures should be arranged, or calorific value of supplementary heater for activating thermostat should be changed. This would require increased assembly parts and complex circuit structure, and it has been difficult to realize such a heating device.

Yet there has been an example of seat heating device coping with such a demand, as disclosed in FIGS. 8 to 10. With reference to FIGS. 8 to 10, there is a heating matter 104 in which a heating wire (cord-like heater) 103 has been arranged in a meandering shape on a base substance 102, and a temperature control circuit 101 is connected to the heating matter 104 in series outside the base substance 102. There is also a temperature detection element 105, comprising such as thermistor, placed at a position adjacent to the heating wire 103. The temperature signal outputted from the temperature detection element 105 controls a current control element such as Power MOS-FET (field effect transistor) incorporated in the temperature control circuit 101, whereby the temperature control of the heating matter 104 is carried out.

There is a circuit board (not shown) of the temperature control circuit 101 as discussed above, incorporated in a case body 113, comprising a first case body 111 and a second case body 112. The first case body 111 has an attachment part 114 serving for attaching and detaching the case body 113 to and from a seat. The second case body 112 has a circuit board fixed thereon.

The case body 113 has connectors 115 which electrically connect the heating matter 104 with the temperature control circuit 101, for the purpose of improving workability by solving problems of limited setting order while mounting the heating matter 104 to the seat.

The temperature detection element 105 has been fixed on the heating matter 104, and it is assumed that the temperature detection element 105 would be electrically connected to the temperature control circuit 101 via the connectors 115. On the other hand, there are lead wires 108 connected to any parts other than the heating matter 104 (for example, connected to a power supply unit), extending outside from a hole of the second case body 112 (for example, see Patent Document 1).

Apart from the Patent Document 1, there are many patent documents disclosing temperature control by using temperature detection element such as thermistor (for example, see Patent Document 2, etc).

With reference to the structure as shown in FIGS. 8 to 10, there are several patent documents suggesting structures in which the temperature control circuit 101 and the temperature detection element 105 have been fixed on the base substance 102 of the heating matter 104 (for example, see paragraphs 0003 and 0005 of Patent Document 3).

Patent Document 1: Japanese Unexamined Patent Publication (Tokukai) No. 2004-272755;
Patent Document 2: Japanese Unexamined Patent Publication (Tokuhyo) No. 2004-504082; and
Patent Document 3: Japanese Unexamined Patent Publication (Tokukai) No. 2004-217796.

DISCLOSURE OF INVENTION

Problems to be Solved by Present Invention

However, according to the structure as shown in Patent Document 1 above, apart from the heating matter 104, the case body 113 incorporating the temperature control circuit 101 must be attached to the seat, and in addition, the heating matter 104 must also be attached to the temperature control circuit 101, thus the assembly workability would be deteriorated. Further, because the case body 113, having complex structure of the attachment part 114 and the part for incorporating the circuit board, is required, the production cost would increase considerably.

With reference to the case body 113, the connection of the first case body 111 with the second case body 112 is done merely by mating with each other, thus the sealing performance between them would become poor. This would cause, for example when used under high-humidity environment, the dew condensation of circuit board, which would then cause deterioration of insulation resistance, and in worse condition, cause fire due to leak of electric current.

Further, when any vibration is given to the extending parts of the lead wires 108 of the second case body 112, the bending load would be applied directly to the lead wires 108, which would cut the lead wires 108.

The temperature detection element 105 to be fixed on the heating matter 104, must be connected to the temperature control circuit 101 placed outside of the base substance 102 of the heating matter 104. Thus, there would require larger number of lead wires 108 electrically connecting between the heating matter 104 and the temperature control circuit 101, which would increase production cost and product weight. In addition, because the connecting length between the temperature detection element 105 and the temperature control circuit 101 becomes longer, the reliability of temperature control would become poor.

According to the structure as disclosed in Patent Document 3, the case body 113 would increase the total size of the temperature control circuit 101. Further, the total thickness of the temperature control circuit would become larger, because of the thickness of the circuit board of the temperature control circuit, the thickness of the first case body 111 and the second case body 112, and the space required for avoiding contact of the electronic parts mounted on the circuit board with the first case body 111 and the second case body 112. Therefore, as discussed in paragraph 0005 of the Patent Document 3, when the heating matter 104, on which the temperature control circuit 101 as discussed above has been fixed, is mounted on the vehicle seat, the user would have strange and uncomfortable feeling, thus such structure cannot be used in actual vehicle seats.

In the light of the above problems, it is an object of the present invention to provide a heating device for seat exhibiting excellent durability, reliability, safety and enhanced workability in assembly work to a seat, while reducing the cost and weight and ensuring comfortable feeling at seating without causing any strange feeling.

Measures to Solve Problems

To achieve the objects mentioned above, according to an exemplary embodiment of the present invention, there is provided a heating device for a seat, comprising a heating matter including a base substance and a heating wire arranged on the base substance, a temperature detection element for detecting temperature of the heating matter, and a temperature control circuit for controlling temperature of the heating matter according to output signal from the temperature detection element, characterized in that the temperature detection element and the temperature control circuit are arranged at predetermined positions on the base substance.

According to another exemplary embodiment of the present invention, there is provided the heating device for a seat, further characterized in that the temperature control circuit is insulation-covered together with a part of lead wires connected to the temperature control circuit.

According to another exemplary embodiment of the present invention, there is provided the heating device for a seat, further characterized in that ends of the lead wires for connecting to the temperature control circuit have been protection-covered in advance, and then is insulation-covered-together with the temperature control circuit.

According to another exemplary embodiment of the present invention, there is provided the heating device for a seat, further characterized in that the insulation-covering is done by heat-shrinkable tube.

According to another exemplary embodiment of the present invention, there is provided the heating device for a seat, further characterized in that the heat-shrinkable tube for the insulation-covering is provided with a thermoplastic adhesive layer in the inside thereof.

According to another exemplary embodiment of the present invention, there is provided the heating device for a seat, further characterized in that the lead wires of the temperature detection element are connected to the temperature control circuit on the base substance.

According to another exemplary embodiment of the present invention, there is provided the heating device for a seat, further characterized in that the temperature control circuit has the thickness not more than 9 mm.

According to another exemplary embodiment of the present invention, there is provided the heating device for a seat, further characterized in that, any surface among the upper and lower surfaces of the temperature control circuit, to which a load is applied when mounted on a seat, is incorporating a reinforcing plate in the inside thereof.

According to another exemplary embodiment of the present invention, there is provided the heating device for a seat, further characterized in that the insulation-covering is done by incorporating the temperature detection element in the temperature control circuit.

According to another exemplary embodiment of the present invention, there is provided the heating device for a seat, further characterized in that the temperature detection element has been mounted at a position adjacent to electronic parts generating heat in the inside of the temperature control circuit.

According another exemplary embodiment of the present invention, there is provided the heating device for a seat, further characterized in that, any surface among the upper and lower surfaces of the temperature control circuit, to which a load is applied when mounted on a seat, is incorporating a reinforcing plate in the inside thereof, and that the temperature detection element is mounted on the other side of the reinforcing plate on which electronic parts have been mounted.

According to another exemplary embodiment of the present invention, there is provided the heating device for a seat, further characterized in that at least one surface among the upper and lower surfaces of the temperature detection element is provided with a heat collecting metal foil.

According to another exemplary embodiment of the present invention, there is provided the heating device for a seat, further characterized in that the reinforcing plate has a groove for incorporating the temperature detection element in the inside thereof.

Merits of Invention

According to an exemplary embodiment of the present invention, the heating device for a seat exhibits excellent durability, reliability, safety and enhanced workability in assembly work to a seat, while reducing the cost and weight and ensuring comfortable feeling at seating without causing any strange feeling.

According to the heating device for a seat of another exemplary embodiment of the present invention, in regard to the heating device for a seat of an exemplary embodiment the present invention, the temperature control circuit is insulation-covered together with a part of lead wires connected to the temperature control circuit, thus the durability of the lead wires against being bent may improve.

According to the heating device for a seat of another exemplary embodiment of the present invention, in regard to the heating device for a seat, the ends of the lead wires for connecting to the temperature control circuit have been protection-covered in advance, and then is insulation-covered together with the temperature control circuit, thus the durability of the lead wires against being bent may improve.

According to the heating device for a seat of another exemplary embodiment of the present invention, in regard to the heating device for a seat, the insulation-covering is done by heat-shrinkable tube, thus the insulation-covering can be done easily.

According to the heating device for a seat of another exemplary embodiment of the present invention, in regard to the heating device for a seat, the heat-shrinkable tube for the insulation-covering is provided with the thermoplastic adhesive layer in the inside thereof, thus the desired insulation-covering may be accomplished without forming any unnecessary space.

According to the heating device for a seat of another exemplary embodiment of the present invention, in regard to the heating device for a seat, the lead wires of the temperature detection element are connected to the temperature control circuit on the base substance, thus the durability against being bent may also improve.

According to the hearing device for a seat of another exemplary embodiment of the present invention, in regard to the heating device for a seat, the temperature control circuit has the thickness not more than 9 mm, thus any strange feeling when being incorporated in a seat may be eliminated.

According to the heating device for a seat another exemplary embodiment of the present invention, in regard to the heating device for a seat, any surface among the upper and lower surfaces of the temperature control circuit, to which a load is applied when mounted on a seat, is incorporating the reinforcing plate in the inside thereof. Thus, any harmful effect to the temperature control circuit due to the seating load may be avoided.

According to the heating device for a seat of another exemplary embodiment of the present invention, in regard to the heating device for a seat, the insulation-covering is done by incorporating the temperature detection element in the temperature control circuit, thus any strange feeling when being incorporated in a seat may also be eliminated.

According to the heating device for a seat of another exemplary embodiment of the present invention, in regard to the heating device for a seat, the temperature detection element has been mounted at a position adjacent to electronic parts generating heat in the inside of the temperature control circuit, thus the temperature detecting performance may improve.

According to the heating device for a seat of another exemplary embodiment of the present invention, in regard to the heating device for a seat, any surface among the upper and lower surfaces of the temperature control circuit, to which a load is applied when mounted on a seat, is incorporating the reinforcing plate in the inside thereof, and the temperature detection element is mounted on the other side of the reinforcing plate on which various electronic parts have been mounted. Thus, the temperature detection element is placed in a position-close to the heating wire (i.e. the essential temperature detection position), and the temperature detecting performance may improve.

According to the heating device for a seat of another exemplary embodiment of the present invention, in regard to the heating device for a seat, at least one surface among the upper and lower surfaces of the temperature detection element is provided with the heat collecting metal foil, thus the temperature detecting performance may improve.

According to the heating device for a seat of another exemplary embodiment of the present invention, in regard to the heating device for a seat, the reinforcing plate has the groove for incorporating the temperature detection element in the inside thereof. Thus, there is no protruding part, and any strange feeling when being incorporated in a seat may be eliminated.

BRIEF DESCRIPTION OF REFERENCE NUMERALS AND SIGNS

Figure 1:
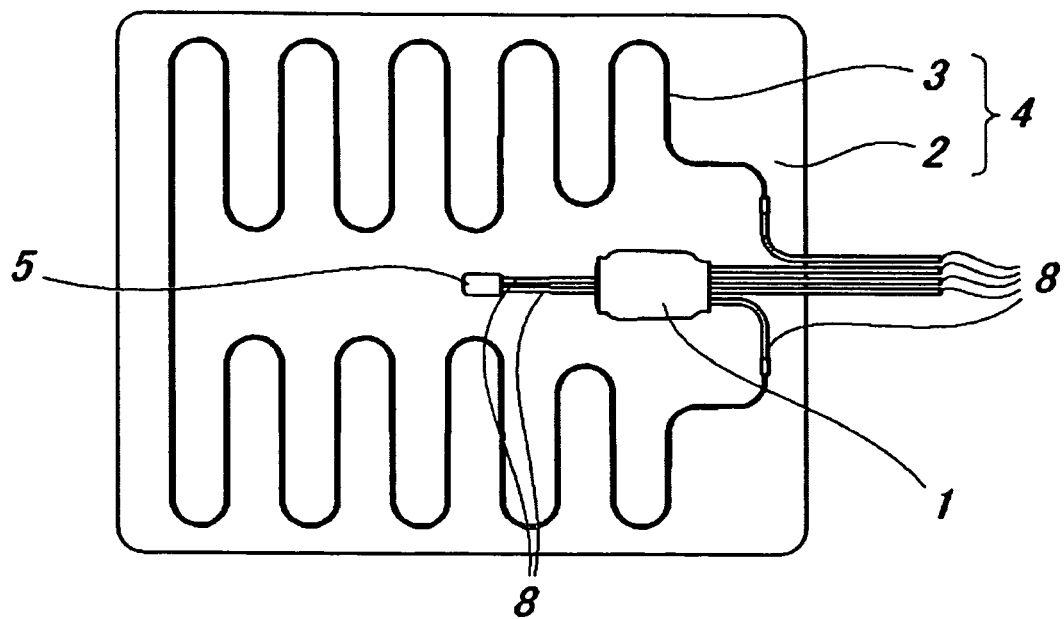
FIG. 1 A plan view showing an embodiment of a heating device for a seat according to the present invention.

1 Temperature control circuit
2 Base substance
3 Heating wire
4 Heating matter
5 Temperature detection element
7 Insulation-covering
8 Lead wires
9 Circuit board
10 Reinforcing plate
11 Protection tube
E Power supply
SW Switch
VR Temperature setting variable resistance

BEST MODE FOR CARRYING OUT THE INVENTION

Figure 4:
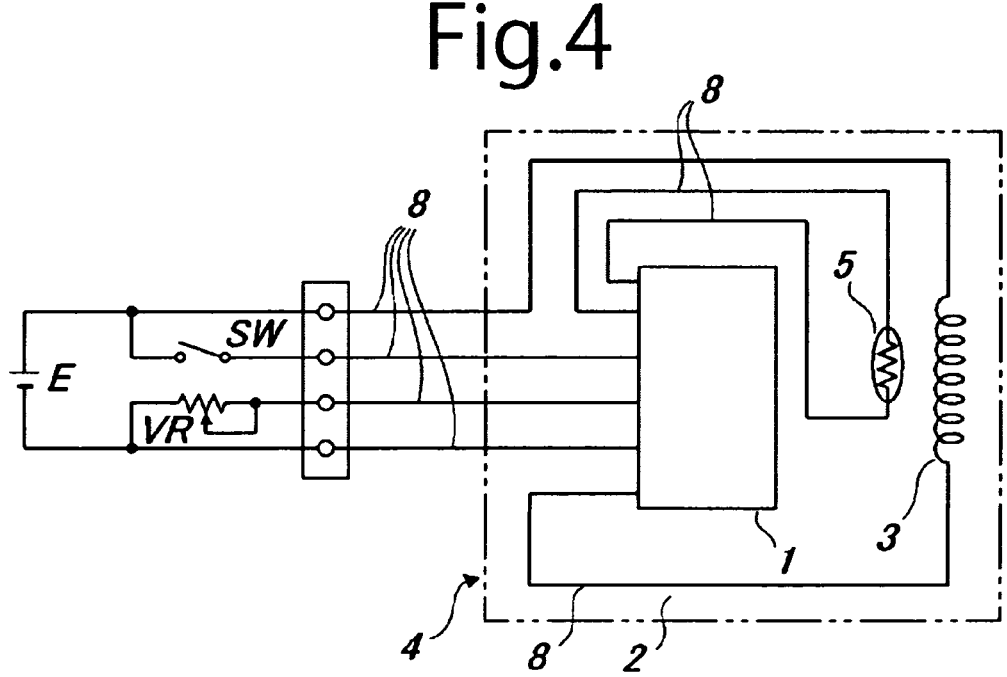
FIG. 4 An example of circuit layout of a heating device for a seat according to an embodiment of the present invention.

An embodiment of the present invention will be explained with reference to FIGS. 1 through 4. As illustrated in FIG. 1, there is a base substance 2, on which a heating wire (cord-like heater) 3 is fixed, and a heating matter 4 comprises the base substance 2 and the heating wire 3. There is also a temperature control circuit 1 placed at a predetermined position of the base substance 2. There are lead wires 8, of which respective one ends are connected to the temperature control circuit 1. The other ends of the lead wires 8 are connected, as illustrated in FIG. 4, to a power supply E, a temperature setting variable resistance VR, a switch SW, a temperature detection element 5, and the heating wire 3. The temperature detection element 5 is placed at a predetermined position on the base substance 2, at which the temperature of the heating matter 4 may be detected as accurate as possible, and the lead wires 8 of the temperature detection element 5 are connected to the temperature control circuit 1 on the base substance 2.

Accordingly, both the temperature detection element 5 and the temperature control circuit 1 have been placed at predetermined positions on the base substance 2 in advance, they can be integrally attached to predetermined positions of a seating part 29 and a seat back part 31 of a seat 27 (see FIG. 3), thus the workability for assembling them to the seat 27 may improve. Further, because the number of the lead wires 8, which are electrically connecting between the heating wire 3 and the temperature control circuit 1, may be reduced, the production cost and the product weight may also be reduced. In addition, because the connecting length (distance) between the temperature detection element 5 and the temperature control circuit 1 may be shortened, the temperature control reliability may also improve.

Figure 2:
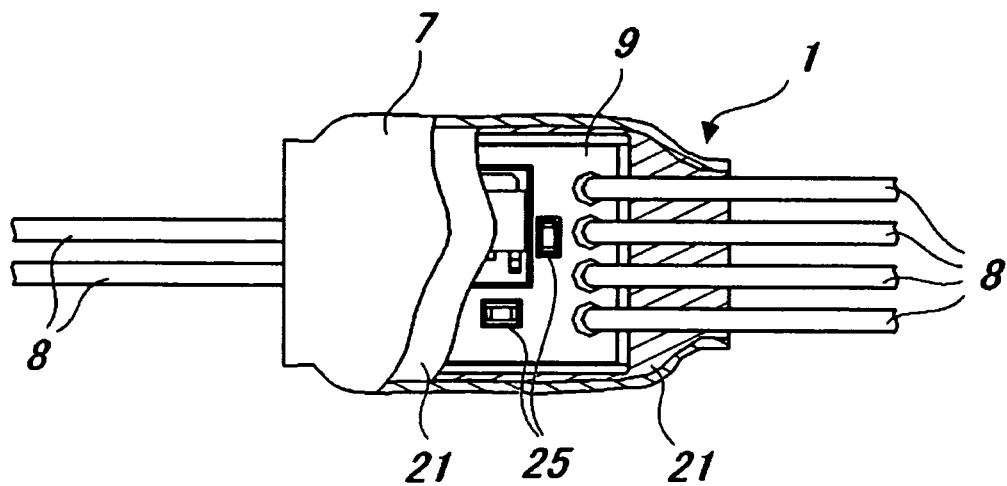
FIG. 2 A partially cutaway plan view of an embodiment of the present invention, showing a temperature control circuit, serving as a part of the heating device for a seat, and being insulation-covered by heat-shrinkable tube, etc.
Figure 3:
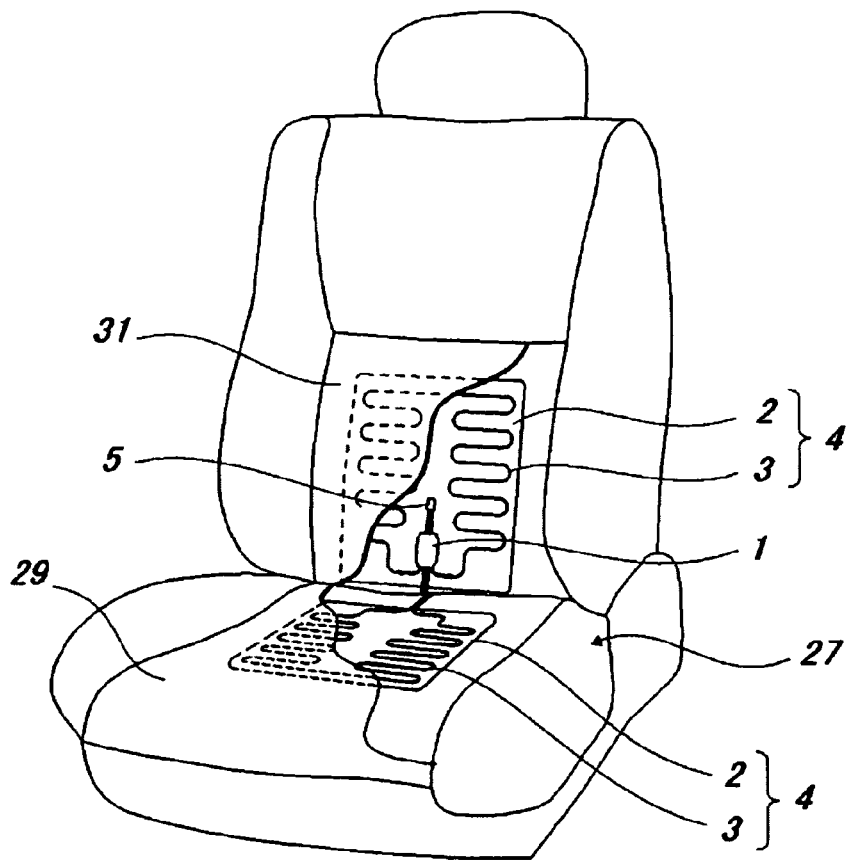
FIG. 3 A schematic view of an embodiment of the present invention, showing an example of assembling a heating device in a seat.

As illustrated in FIG. 2, the temperature control circuit 1 of the present embodiment has been insulation-covered together with a part of the lead wires 8 connected to the temperature control circuit 1. The insulation-covering may be done by using a heat-shrinkable tube 7 composed of an organic material. There is a layer of thermoplastic adhesive 21 on the inner surface of the heat-shrinkable tube 7. After placing a circuit board 9 in the inside of this heat-shrinkable tube 7, the heat is applied to the heat-shrinkable tube 7, whereby the heat-shrinkable tube 7 is shrunken, and the surfaces of the circuit board 9 is coated by thermoplastic adhesive 21 filled into these surfaces. As illustrated in FIG. 2, the melted thermoplastic adhesive 21 is filled in an opening of the heat-shrinkable tube 7 without leaving any space.

It is also possible that, after placing the circuit board 9 in the inside of the heat-shrinkable tube 7, any thermoplastic or thermosetting organic material may be filled from the opening of the heat-shrinkable tube 7. The length of insulation-covering of the lead wires 8 by the heat-shrinkable tube 7 has been set to a predetermined value at which the humidity-resistance is secured and the durability of the lead wires 8 against being bent may improve.

Accordingly, as long as the temperature control circuit 1 is insulation-covered by the heat-shrinkable tube 7 together with a part of the lead wires 8, it is possible to prevent fire due to dew condensation of the circuit board 1, and the insulation-covering may also ease the bending load applied to the lead wires 8, whereby the cut of lead wires 8 may be prevented. Further, any large-sized case body as described in paragraph 0004 is no longer required, and the size and thickness of the temperature control circuit 1 may be reduced remarkably, thus the comfortable seating feeling may be given to the user without causing strange feeling.

The thickness of the insulation-covering on the temperature control circuit 1, after being covered, is not more than 9 mm, because this thickness will not give any strange feeling to the user. Further, because the temperature control circuit 1 is placed at a predetermined position of the base substance 2 where no strange feeling is given to the user while being seated, the very comfortable seating feeling may be given to the user.

The insulation-covering of the temperature control circuit 1 to be not more than 9 mm is not limited to the heat-shrinkable tube 7. For example, resin molding or resin potting may be used. Further, it is also possible to wrap the temperature control circuit 1 by resin or rubber sheet on which adhesive has been coated.

Figure 6:
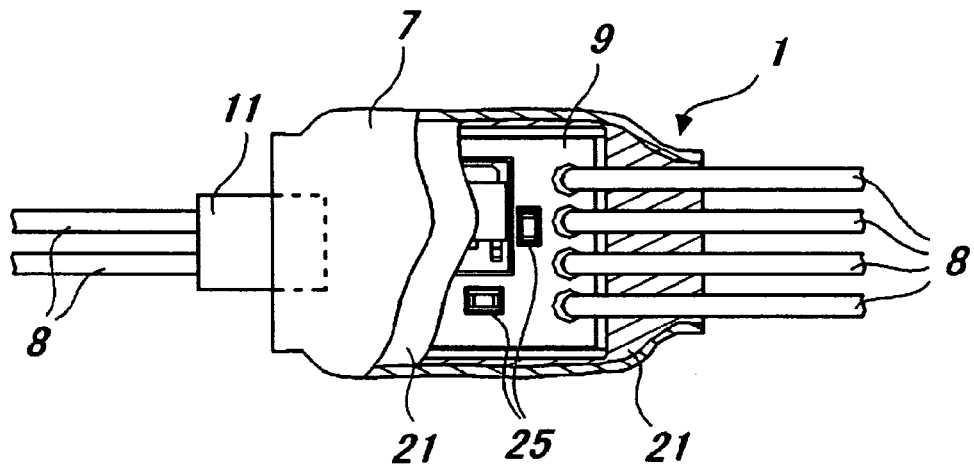
FIG. 6 A partially cutaway plan view of another embodiment of the present invention, showing a temperature control circuit, serving as a part of the heating device for a seat, and being insulation-covered by heat-shrinkable tube, etc.

As illustrated in FIG. 6, it is also possible to place a protection tube 11 on the lead wires 8 in advance, serving as a protection covering, and thereafter, the heat-shrinkable tube 7 may be placed thereon and insulation-covering may be carried out. This will prevent the lead wires 8 from being cut due to bending of the end of insulation-covering, even when the lead wires 8 having smaller diameter are used. The protection tube 11 may be the same type as that of the heat-shrinkable tube for insulation-covering discussed above.

EXAMPLES OF INVENTION

Examples of the present invention will be discussed further, with first reference to FIGS. 1 through 4.

According to the present example, several electric and electronic parts are connected by the lead wires 8. As illustrated in FIG. 4, the positive electrode of the power supply E and the circuit board 9 are connected via the switch SW, and the negative electrode of the power supply E and an end of the heating wire 3 are also connected. The positive electrode and the negative electrode of the lead wires 8 of the temperature detection element 5 are both connected to the circuit board 9 directly. The circuit board 9 and the temperature setting variable resistance VR are connected, and the circuit board 9 is also grounded.

The circuit board 9 is first placed in the inside of the heat-shrinkable tube 7, of which inner layer being provided with the thermoplastic adhesive 21, and of which outer layer is made of electron beam cross-linking olefin resin. Thereafter, the insulation-covering is done by applying heat thereto. At that time, the thickness of the temperature control circuit 1 is set as not more than 9 mm. The circuit board 9 is insulation-covered by the heat-shrinkable tube 7 together with a part of the lead wires 8, and the covering length of such lead wires 8 is preferably about 10 mm, which will satisfy good insulation performance and durability against being bent.

The temperature detection element 5 is fixed on a predetermined position within a wiring space of the heating wire 3, where the temperature of the heating device for a seat may be detected accurately. If the temperature detection element 5 is placed at an excessively close position to the heating wire 3, the heat of the heating wire 3 is detected before the temperature of the heating device for a seat reaches the set temperature, and the power supply to the heating wire 3 will be cut off at an inadequately earlier timing.

The circuit board 9 which has been insulation-covered by the heat-shrinkable tube 7 is in small size (about 25 mm×40 mm), in small thickness (not more than 9 mm), and is placed around the heating matter 4 at which any strange feeling is given to the user while being seated.

Figure 5:
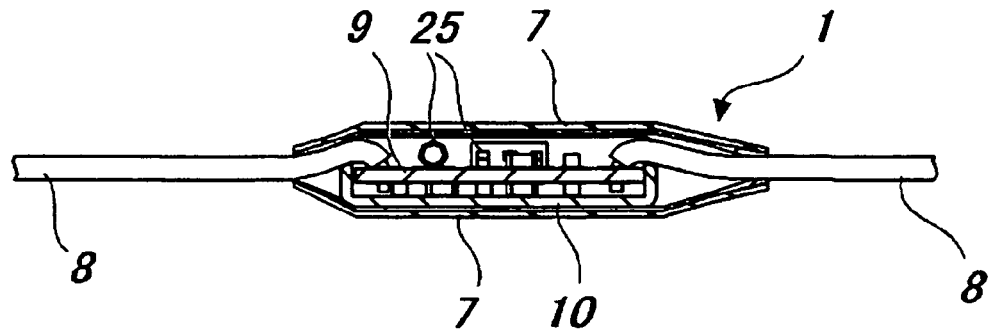
FIG. 5 A section view of a heating device for a seat according to another embodiment of the present invention.

Further, as illustrated in FIG. 5, a reinforcing plate 10 made of resin, etc., may be placed on the circuit board 9, and the insulation-covering is done by the heat-shrinkable tube 7. This structure will prevent the circuit board 9 from being damaged due to impact and load of seating of the user. When the reinforcing plate 10 is used, the damage to the circuit board 9 may be prevented more effectively, by placing the reinforcing plate 10 on the seating side of the temperature control circuit 1.

It is also possible to incorporate the temperature detection element 5 and the circuit board 9 integrally in the heat-shrinkable tube 7 for the purpose of improving-workability when the temperature control circuit 1 is mounted on the base substance 2. In such a case, for example, the temperature detection element 5 may be placed at a position adjacent to any element 25 which generates heat (such as FET) among the elements 25 of the circuit board 9, whereby the pseudo heat detection of this element 25 is done by the temperature detection element 5, and the temperature control of the heating matter 4 may be carried out.

Figure 7:
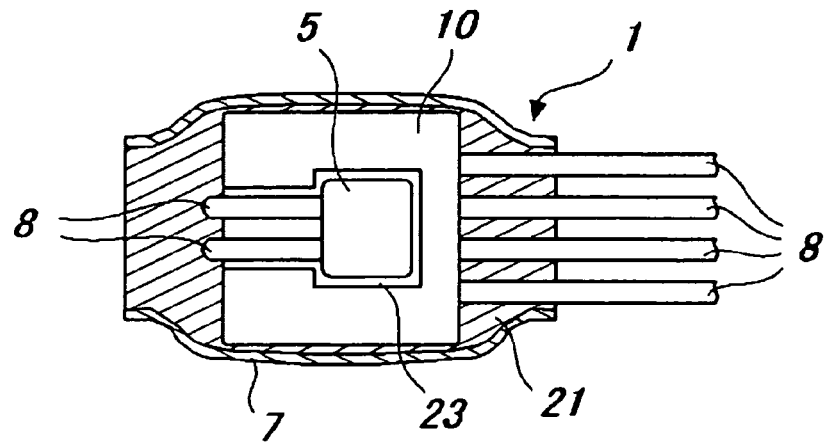
FIG. 7 A section view of a heating device for a seat according to another embodiment of the present invention.
Figure 8:
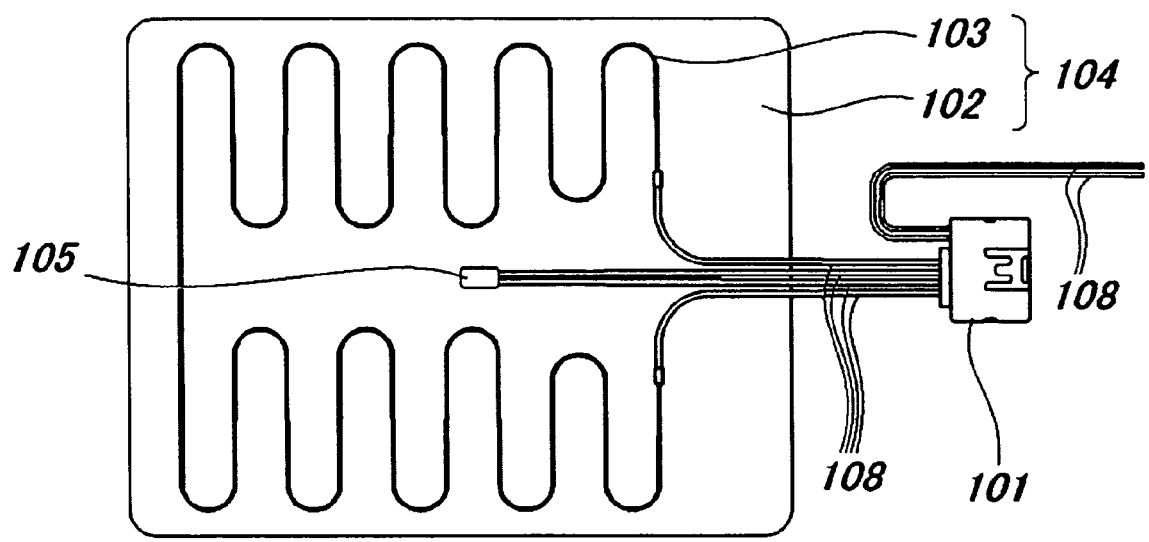
FIG. 8 A plan view of a heating device for a seat according to a prior art.
Figure 9:
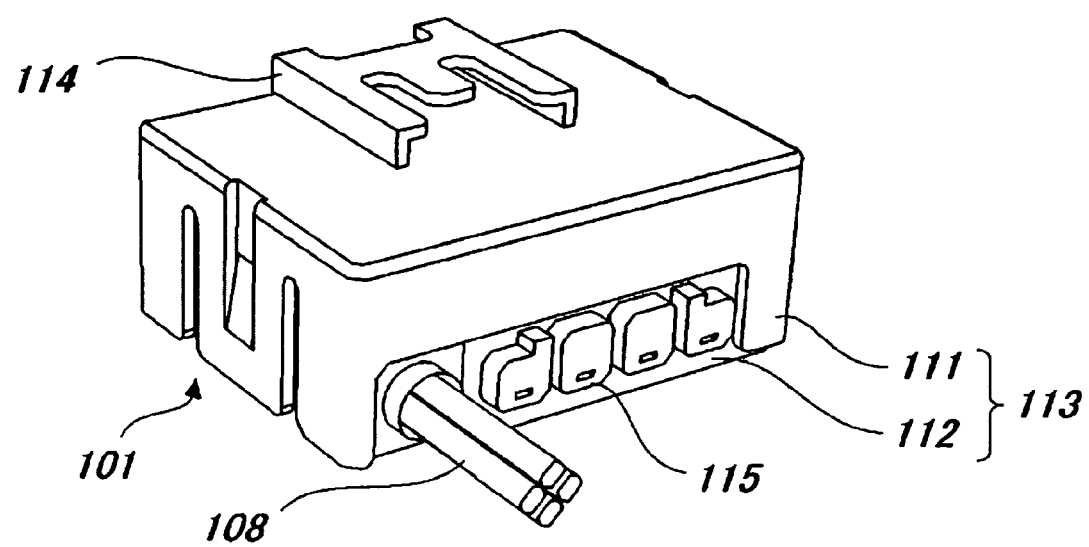
FIG. 9 A schematic view of a temperature control circuit serving as a part of a heating device for a seat according to a prior art.
Figure 10:
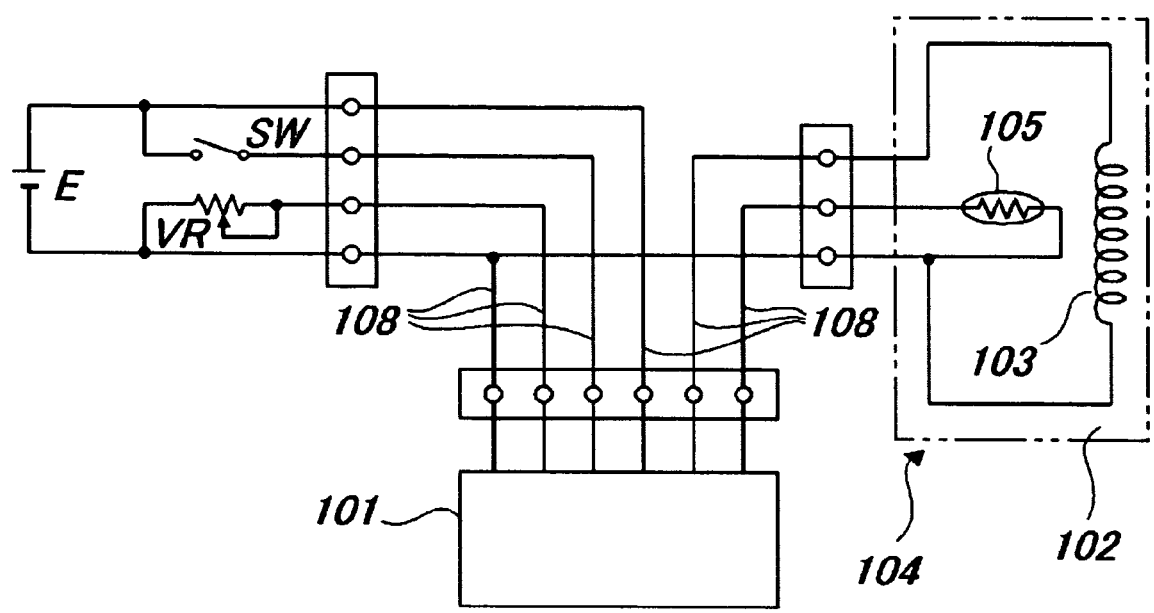
FIG. 10 A circuit layout of a heating device for a seat according to a prior art.

The temperature detection element 5 may be placed on the other side of the reinforcing plate 10 on which the elements 25 of the circuit board 9 have been placed. In such a case, as illustrated in FIG. 7, a groove 23 for incorporating the temperature detection element 5 has been provided on the reinforcing plate 10, whereby the temperature detection element 5 is incorporated in this groove 23. In addition, metal foil, such as made of aluminum, may be provided on the upper or lower surface of the temperature detection element 5 for collecting the heat.

The heating wire 3 has been arranged on the base substance 2, and the temperature control circuit 1 is placed on the base substance 2 by double-face adhesive tape, etc. It is also possible to fix the temperature control circuit 1 by a sheet at an appropriate size, made of the same material as that of the base substance 2, on which the double-face adhesive tape has been pasted, for the purpose of improving fixing reliability.

As the temperature detection element 5, for example, thermistor, platinum resistance element, or thermocouple may be used, and any suitable one may be selected by considering the temperature detection accuracy, production cost, etc.

Where conductivity providing agent is added to the heat-shrinkable tube 7 (i.e. the insulation-covering material), the circuit board 9 may be shielded from noise generated inside the vehicle, and this is preferable from the viewpoint of preventing bad effect by noise. As the conductivity providing agent, any material known as prior art, for example, carbon black particle, graphite particle, ground carbon fiber, metal powder, metal-oxide powder, conductive polymer powder, etc., may be used.

INDUSTRIAL APPLICABILITY

As above discussed, according to the present invention, it is possible to provide the heating device for seat exhibiting excellent durability, reliability, safety and enhanced workability in fixing work to a seat, while reducing the cost and weight and ensuring comfortable feeling at seating without causing any strange feeling. The heating device for a seat may also be applied, for example, to seats of motorcycles or railway coaches, child safety seats, seats of boats or aircrafts, seats of Ferris wheel in amusement park, seats of various athletic stadiums, seats of theaters and cinemas, benches of stations, theme parks or ordinary parks, sofas and seats for houses and offices, seats of barbershop, medical seats used in various medical facilities, etc. Further, the present invention may be applied not only to seats, but also to various industrial fields widely, such as for beds, blankets and quilts, pillows, baby carriages, toilet seat covers, clothing, etc.

The heating device for a seat according to the present invention may also be applied to a seat in which an air conditioner has been incorporated. Further, the present invention is not limited to be used inside the seat, and it is also possible to use on the outer surface of seat after assembly of the seat has been completed.

The invention claimed is:

1. A heating device for a seat comprising:
a heating matter including a base substance and a heating wire arranged on said base substance;
a temperature detection element for detecting temperature of said heating matter; and
a temperature control circuit for controlling temperature of said heating matter according to an output signal from said temperature detection element,
wherein said temperature detection element and said temperature control circuit are arranged at predetermined positions on an outer surface of said base substance,
wherein said temperature control circuit and a part of a lead wire connected to said temperature control circuit are covered with an insulation-covering,
said insulation-covering comprises a heat-shrinkable tube with a thermoplastic adhesive layer on an inside surface of said heat-shrinkable tube, and
said temperature control circuit and said part of said lead wire are fixed by thermoplastic adhesive of said thermoplastic adhesive layer in said insulation-covering.

2. The heating device for a seat as claimed in claim 1, wherein
said temperature detection element and said temperature control circuit are connected by flexible lead wire, and
said temperature control circuit and a part of said flexible lead wire are fixed by thermoplastic adhesive of said thermoplastic adhesive layer in said insulation-covering.

3. The heating device for a seat as claimed in claim 2, wherein ends of said lead wire for connecting to said temperature control circuit have been protection-covered in advance, and are covered with the insulation-covering together with said temperature control circuit.

4. The heating device for a seat as claimed in claim 1, wherein said lead wire of said temperature detection element are connected to said temperature control circuit on said base substance.

5. The heating device for a seat as claimed in claim 1, wherein said temperature control circuit comprises the thickness of not more than 9 mm.

6. The heating device for a seat as claimed in claim 1, wherein a surface among the upper and lower surfaces of said temperature control circuit, to which a load is applied when mounted on a seat, includes a reinforcing plate in the inside of said temperature control circuit.

7. The heating device for a seat as claimed in claim 1, wherein said insulation-covering covers said temperature detection element in said temperature control circuit.

8. The heating device for a seat as claimed in claim 7, wherein said temperature detection element is disposed at a position adjacent to electronic parts generating heat in the inside of said temperature control circuit.

9. The heating device for a seat as claimed in claim 7, wherein a surface among the upper and lower surfaces of said temperature control circuit, to which a load is applied when being mounted on a seat, includes a reinforcing plate inside of said temperature control circuit, and
wherein said temperature detection element is mounted on a side of the reinforcing plate other than a side of said reinforcing plate on which electronic parts have been mounted.

10. The heating device for a seat as claimed in claim 7, wherein at least one surface among the upper and lower surfaces of said temperature detection element includes a heat collecting metal foil.

11. The heating device for a seat as claimed in claim 7, wherein said reinforcing plate includes a groove for incorporation of said temperature detection element in an inside of said groove.

12. The heating device for a seat as claimed in claim 1, wherein said temperature control circuit is fixed to the base substance.

13. The heating device for a seat as claimed in claim 1, wherein the base substance is attached to the seat.

14. The heating device for a seat as claimed in claim 1, wherein the heating wire is fixed to the base substance.

15. The heating device for a seat as claimed in claim 1, wherein said temperature detection element and said temperature control circuit are fixed to the outer surface of the base substance.

16. The heating device for a seat as claimed in claim 1, wherein the insulation-covering includes a conductivity providing agent.

17. The heating device for a seat as claimed in claim 1, wherein the base substance comprises a substantially flat sheet.

* * * * *